Figure 1:
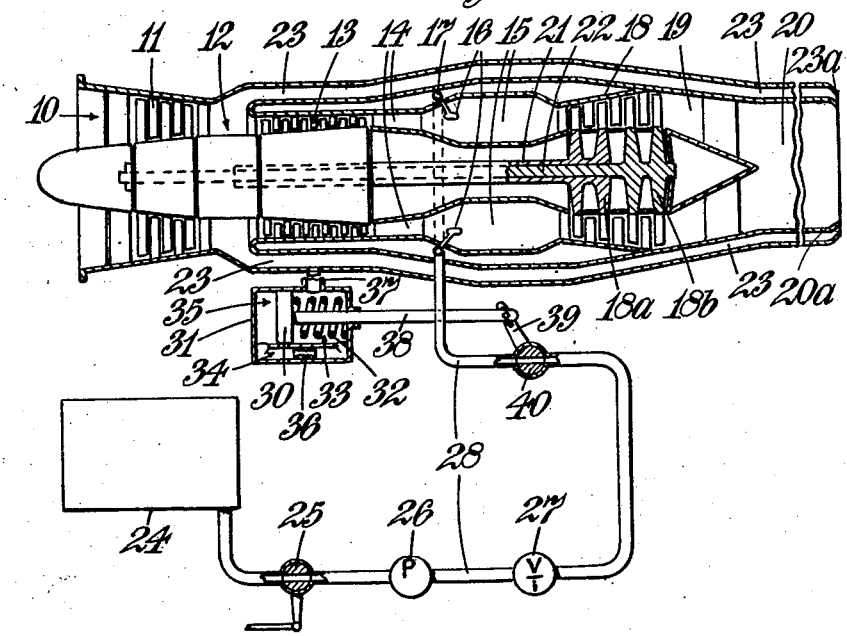

INVENTOR
HENRY COOK

United States Patent Office 2,810,258
Patented Oct. 22, 1957

2,810,258

FUEL CONTROL MEANS RESPONSIVE TO RATE OF CHANGE OF BY-PASS DUCT PRESSURE IN BY-PASS GAS TURBINE ENGINES

Henry Cook, Derby, England, assignor to Rolls-Royce Limited, Derby, England, a British company Application June 11, 1953, Serial No. 360,873

Claims priority, application Great Britain June 17, 1952

6 Claims. (Cl. 60—35.6)

This invention relates to gas-turbine engines of the type hereinafter referred to as "by-pass gas-turbine engines" which type comprises a compressor system including low-pressure and high-pressure compressor stages, combustion equipment connected with the outlet from the high-pressure compressor stage, turbine means to drive the compressor stages and connected to receive combustion gases from the combustion equipment, an exhaust duct connected to receive the exhaust gases from the turbine means, and a by-pass duct connected at one end to receive a proportion of the compressed air delivered by the low-pressure compressor stage and connected at the other end to deliver the proportion of compressed air into the exhaust duct, or directly to atmosphere via a propelling nozzle.

It has been found that if during operation of a by-pass gas-turbine engine a sudden fall of pressure occurs in the by-pass duct owing, for example, to bursting of the duct, damage may occur to the engine due to overheating since the normal fuel controls are unable to operate sufficiently quickly to reduce the rate of fuel supply to the combustion equipment to compensate for the rapid fall in mass air flow through the combustion equipment.

This invention has for an object to provide an improved arrangement whereby the disadvantage above set forth can be avoided.

According to the present invention, a by-pass gas-turbine engine is provided with pressure-sensitive means arranged to be sensitive to the rate of change of pressure within the by-pass duct and arranged to reduce the fuel supply to the engine when the pressure within the by-pass duct falls at or above a selected rate of fall of pressure. Preferably it is arranged that the pressure-sensitive means cuts off the supply of fuel to the combustion equipment of the engine when such a rate of fall of pressure is sensed.

According to a feature of this invention, the pressure-sensitive means may comprise a chamber divided into two pressure spaces by a member displaceable within the chamber, a passage interconnecting said spaces, a flow restrictor in said passage, a direct connection between one of the pressure spaces and the by-pass duct so that the pressure within said one pressure space falls with the pressure in the by-pass duct, and resilient means to load the displaceable member towards the other of the pressure spaces. When the rate of fall of pressure within the by-pass duct and said one space exceeds a certain value the displaceable member will be moved towards said one space against the action of the resilient means and the displacement of the displaceable member is employed either directly or through a rapidly-operating relay or toggle mechanism to reduce or cut-off the fuel supply to the combustion equipment.

According to yet another feature of this invention, the effective area of the flow restrictor may be variable in accordance with the ambient atmospheric pressure at which the engine is operating; in this case it is arranged that as the ambient pressure decreases the effective area of the flow restrictor is reduced. The term ambient atmospheric pressure includes the engine intake pressure.

Figure 2:
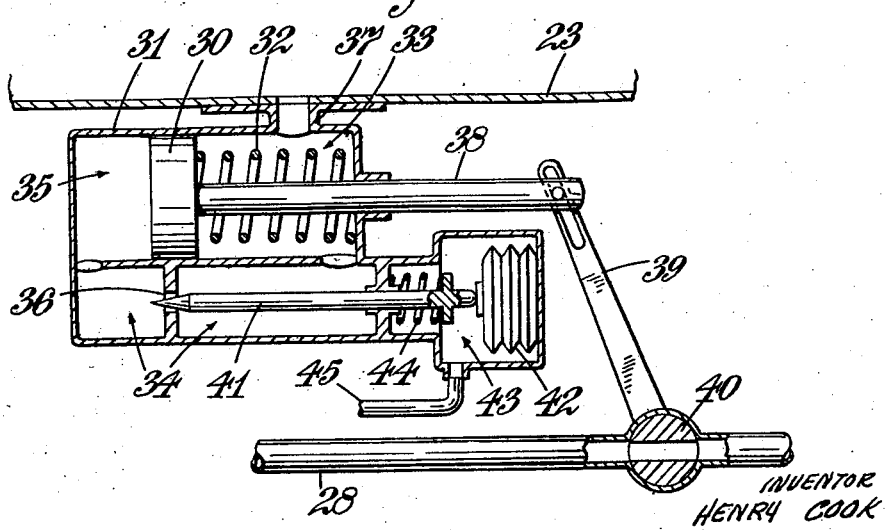

Two control arrangements in accordance with this invention will now be described with reference to the accompanying drawings in which:

Figure 1 shows a by-pass gas-turbine engine with a control of this invention applied thereto, and Figure 2 shows a modified form of the control.

Referring to Figure 1, there is shown diagrammatically one known form of by-pass gas-turbine engine. The engine comprises an air intake 10 leading to a low-pressure compressor 11, and the outlet section of the low-pressure compressor is indicated at 12.

Connected to the outlet section 12 to receive part of the compressed air delivered thereto by the low-pressure compressor 11 is a high-pressure compressor 13 having a delivery section 14 leading to combustion equipment 15. Fuel is burnt in the combustion equipment 15 and the fuel is supplied through nozzles 16 connected to a supply manifold 17.

The products of combustion pass into a turbine 18, shown as a multi-stage turbine, to drive it and the exhaust gases from the turbine 18 pass into an exhaust assembly 19 leading to an exhaust pipe 20 through which the exhaust gases are conveyed to a propelling nozzle 20a. The turbine 18 is shown to have two independent rotors 18a, 18b, of which the high-pressure rotor 18a drives the high-pressure compressor 13 through a shaft 21 and of which the low-pressure rotor 18b drives the low-pressure compressor 11 through a shaft 22.

Also connected to the outlet section 12 from the low-pressure compressor 11 is a by-pass duct 23 which is of annular form and extends around the engine and axially thereof from the outlet section 12 to beyond the turbine 18. The by-pass duct 23 either opens into the exhaust pipe 20 so that the by-pass air mixes with the exhaust gases, or, as shown, opens to atmosphere through an auxiliary propelling nozzle 23a. It will be apparent that in both cases the by-pass air passes to atmosphere through a propelling nozzle which affords a restriction to the outlet of the by pass air, and the pressure in the by-pass duct is therefore above atmospheric pressure.

The fuel system is indicated diagrammatically and may be of any convenient form. As shown it comprises a fuel tank 24, and a fuel delivery pipe 28 having in it a low-pressure shut-off cock 25, a fuel pump 26, and a throttle valve 27. The opening of the throttle valve and the fuel pump delivery pressure will normally be controlled manually or automatically, or both, to maintain a desired fuel delivery through the delivery pipe 28 to the manifold 17 and thus to the injectors 16.

It will be understood that the invention is not limited to the particular construction of engine and fuel system shown.

In operation of a by-pass gas-turbine engine, over-fueling may occur in the combustion equipment 15 if the pressure in the by-pass duct 23 falls so rapidly that the fuel system does not respond sufficiently rapidly to cut down the fuel supply, and the present invention provides means to avoid difficulties due to such sudden or rapid fall in by-pass duct pressure.

In the arrangement shown in Figure 1, the pressure-sensitive means comprises a piston and cylinder device having a piston 30 movable within a cylinder 31 against the action of a spring 32 accommodated within a cylinder space 33 to one side of the piston, a passage 34 in the wall of the cylinder 31 interconnecting the cylinder space 33 with the space 35 on the other side of the piston 30, a fixed-area orifice 36 in said passage 34 and a direct pressure connection 37 from the cylinder space 33 accommodating the spring 32 to the by-pass duct 23 of the by-pass gas-turbine engine. The rod 38 of the piston 30 extends from one surface of the piston 30, for example the surface facing the cylinder space 33 accommodating the spring 32, and is connected either directly (as shown) or through a toggle mechanism or an electrical switch controlling a relay or through any other convenient servo means to the operating arm 39 of a fuel-shut-off cock 40 connected in the delivery pipe 28 of the fuel system of the by-pass gas-turbine engine.

The effective areas of the sides of the piston 30, the effective area of the flow-restricting orifice 36 and the strength of the spring 32 are selected so that if during operation, the pressure in the by-pass duct 23 falls rapidly due say to leaks or bursting, the pressure in cylinder space 33 falls rapidly relative to that in space 35 and the piston 30 is displaced against the action of the spring 32 thereby to close the shut-off cock 40. In this way damage to the combustion equipment and turbine of the engine, due to overheating owing to the slow response of the fuel system controls, is avoided.

The safety arrangement just described is most suitable for use where the ambient atmospheric pressure will be substantially constant.

In a modification of the arrangement shown, the spring 32 may be omitted, and the pressure connection 37 made to the space 35 on the larger-area side of the piston instead of to the space 33. The piston 30 will thus normally remain at the right-hand end of cylinder 31 in operation, due to the difference in areas on each side of the piston, but if the pressure in the by-pass duct should fall rapidly, the piston 30 will move to the left-hand end of the cylinder. The piston will thus be connected to cock 40 so that the latter is open when the piston is at the right-hand end of the cylinder and is closed by movement of the piston to the left-hand end.

For by-pass gas-turbine engines employed for aircraft propulsion, it is preferable to render the safety device altitude-sensitive and for this purpose the flow restricting orifice 36 in the passage interconnecting the two cylinder spaces is made adjustable in effective area, the area being reduced as altitude increases, i. e. as the ambient atmospheric pressure decreases.

One arrangement for this purpose is shown in Figure 2, and in this arrangement the flow restrictor 36 has associated with it a needle valve element 41 to vary the effective orifice area. The opposite end of the needle valve element 41 bears on an evacuated capsule 42 which is accommodated in a chamber 43 connected by a conduit 45 to respond to the pressure in the intake 10 of the by-pass gas-turbine engine, which pressure varies with the ambient atmospheric pressure. As the ambient pressure decreases, the capsule 42 expands so moving the needle valve 41 to decrease the effective area of the flow restricting orifice 36, and vice versa. A spring 44 holds the needle valve element 41 in contact with the capsule 42.

I claim:

1. In combination with a by-pass gas turbine engine comprising a low-pressure compressor stage, a high-pressure stage connected with the outlet of said low-pressure compressor stage, combustion equipment connected with the outlet from the high-pressure compressor stage, turbine means adapted to drive the compressor stages and connected to receive combustion gases from the combustion equipment, fuel supply means adapted to deliver fuel to said combustion equipment and including a fuel delivery conduit through which said fuel is delivered, a propelling nozzle, and a by-pass duct connected at its inlet end to the outlet of said low-pressure compressor stage and adapted to deliver the by-passed air to the propelling nozzle to pass therethrough to atmosphere as a propulsive jet; a control arrangement comprising pressure-responsive means connected to said by-pass duct and adapted to respond to a rapid fall in pressure in said by-pass duct, and valve means in said fuel delivery conduit and connected to said pressure-responsive means to be operated thereby to reduce the fuel flow to the engine on sensing of a rapid fall in pressure in the by-pass duct.

2. A combination as claimed in claim 1, said valve means being adapted in one position to cut off completely the flow through said fuel delivery conduit and said pressure-responsive means being connected to set said valve means in said position on sensing a rapid fall of pressure in said by-pass duct.

3. A combination as claimed in claim 1, said pressure-responsive means comprising a chamber, a member displaceable within the chamber to divide the chamber into two pressure spaces, said displaceable member being connected to actuate said valve means, a passage interconnecting said pressure spaces, a flow restrictor in said passage, a direct connection between one of the pressure spaces and the by-pass duct so that the pressure within said one pressure space falls with the pressure in the by-pass duct, and resilient means to load the displaceable member towards the other of the pressure spaces.

4. A combination as claimed in claim 3, said member comprising a piston whereof its sides have different effective areas, said piston being arranged with its side of smaller effective area facing the said one pressure space so that the resilient means acts to load the piston to move towards the pressure space facing its side of greater effective area.

5. A combination as claimed in claim 1, said pressure responsive means comprising a chamber, a member displaceable within the chamber to divide the chamber into two pressure spaces, said displaceable member being connected to actuate said valve means, a passage interconnecting said pressure spaces, a flow restrictor in said passage, means responsive to the ambient atmospheric pressure and adapted to co-operate with said flow restrictor to vary its effective area to increase the area on increase of the atmospheric pressure and to decrease the area on decrease of the atmospheric pressure, a direct connection between one of the pressure spaces and the by-pass duct so that the pressure within said one pressure space falls with the pressure in the by-pass duct, and resilient means to load the displaceable member towards the other of the pressure spaces.

6. A combination as claimed in claim 5, said flow restrictor comprising an orifice, and a needle valve adapted to be adjusted and to co-operate with said orifice thereby on adjustment to vary the effective area of the orifice, said needle valve being connected to said atmospheric pressure-responsive means to be adjusted thereby in a manner to increase the effective area of the orifice on increase of atmospheric pressure and decrease the effective area on decrease of atmospheric pressure.

References Cited in the file of this patent
UNITED STATES PATENTS

| | | |
|---|---|---|
| 2,458,600 | Imbert et al. | Jan. 11, 1949 |
| 2,464,724 | Sédille | Mar. 15, 1949 |
| 2,503,048 | Ifield | Apr. 4, 1950 |
| 2,632,298 | Willgoos | Mar. 24, 1953 |
| 2,694,290 | Best | Nov. 16, 1954 |